(12) United States Patent
Ruschmann

(10) Patent No.: US 6,317,947 B1
(45) Date of Patent: Nov. 20, 2001

(54) METHOD OF PRODUCING METALLIC FLAKES

(75) Inventor: Henry W. Ruschmann, Bernardsville, NJ (US)

(73) Assignee: Meadowbrook Inventions, Inc., Bernardsville, NJ (US)

( * ) Notice: Subject to any disclaimer, the term of this patent is extended or adjusted under 35 U.S.C. 154(b) by 0 days.

(21) Appl. No.: 09/188,150

(22) Filed: Nov. 9, 1998

Related U.S. Application Data

(60) Provisional application No. 60/066,050, filed on Nov. 14, 1997.

(51) Int. Cl.[7] ................................................ B21D 33/00
(52) U.S. Cl. ........................ 29/17.2; 427/404; 427/250; 264/140
(58) Field of Search .................... 29/17.2, 426.3; 427/250, 404, 553, 296; 264/140, 293; 156/155, 209

(56) References Cited

U.S. PATENT DOCUMENTS

| 2,243,237 | 5/1941 | Whiley . | |
|---|---|---|---|
| 2,702,254 | 2/1955 | Dowd . | |
| 4,434,010 | * 2/1984 | Ash ........................................ | 106/291 |
| 5,059,245 | * 10/1991 | Phillips et al. ........................... | 106/22 |
| 5,135,812 | 8/1992 | Phillips et al. . | |
| 5,281,480 | 1/1994 | Phillips et al. . | |
| 5,383,995 | 1/1995 | Phillips et al. . | |
| 5,415,950 | 5/1995 | King et al. . | |
| 5,424,119 | * 6/1995 | Phillips et al. ........................... | 428/328 |
| 5,500,313 | 3/1996 | King et al. . | |
| 5,549,774 | * 8/1996 | Miekka et al. ............................ | 156/209 |
| 5,569,535 | 10/1996 | Phillips et al. . | |
| 5,571,624 | 11/1996 | Phillips et al. . | |
| 5,629,068 | * 5/1997 | Miekka et al. ............................ | 428/148 |
| 5,653,792 | 8/1997 | Phillips et al. . | |
| 5,672,410 | * 9/1997 | Miekka et al. ............................ | 428/148 |

\* cited by examiner

*Primary Examiner*—S. Thomas Hughes
*Assistant Examiner*—Jermie E. Cozart
(74) *Attorney, Agent, or Firm*—Francis C. Hand; Carella, Byrne, Bain, Gilfillan, Cecchi

(57) ABSTRACT

Decorative, protective metallic flakes are made by coating a polyplastic web with a release coating; depositing a resin on the release coating; depositing a metal layer on the resin to form a sandwich; and treating the sandwich with a solvent in order to remove the metal and resin layers in the form of metallic flakes.

16 Claims, 1 Drawing Sheet

METHOD OF PRODUCING METALLIC FLAKES

This application claims benefit of provisional No. 60/066,050 filed Nov. 14, 1997.

BACKGROUND OF THE INVENTION

The present invention is directed to ultra-thin protective, decorative metallic flakes and a process for producing the flakes. The flakes may produce either prismatic effects or a simple color coating when applied to a variety of surfaces. The prismatic effects, which are generated by holographic methods, enable information to be included on the flakes for document and product authenticity.

SUMMARY OF THE INVENTION

The present invention is directed to protective, decorative metallic flakes and a method of producing such flakes by depositing a release layer, a resin layer and a metal layer on a polyplastic web in that order. The metal and resin layers are then removed in the form of metallic flakes by treating the coated polyplastic web with a solvent.

The process is economically advantageous in that it produces a large quantity of ultra-thin metallic flakes at low cost as compared to other known processes that produce metallic powders and chips. Because the metallic flakes are very thin, a small amount of the flakes can replace larger, heavier and more costly powders and chips in a variety of applications.

DETAILED DESCRIPTION OF PREFERRED EMBODIMENTS

Figure 1:
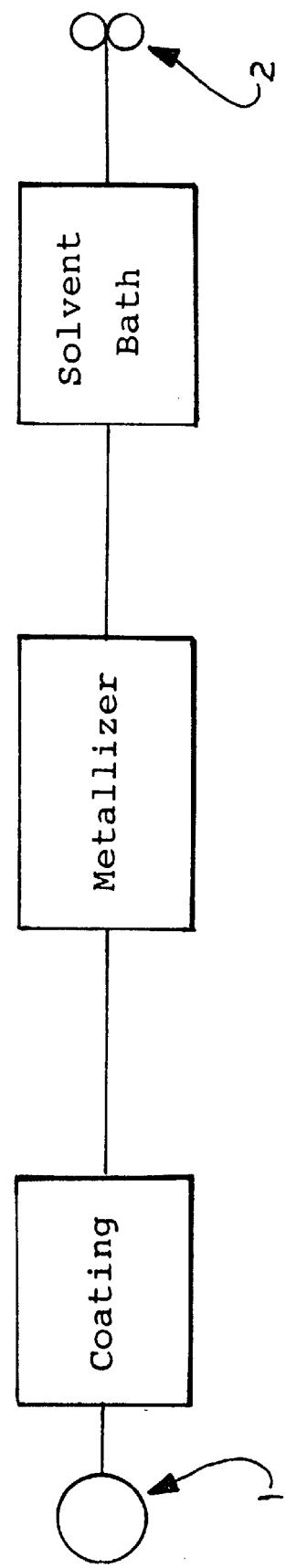
FIG. 1 is a schematic illustration of an apparatus used to produce metallic flakes according to the present invention.

According to the present invention, protective, decorative metallic flakes are produced by a process comprising coating a polyplastic web with a wax release layer; coating the wax with a resin; depositing a metal layer on the resin to form a sandwich (e.g., metal layer, optional prismatic light diffraction layer, resin, wax, polyplastic film); and then treating the sandwich with a solvent in order to remove metallic flakes from the release layer.

Specific embodiments of the present invention will now be described in detail. These embodiments are intended to be illustrative only, and the invention is not limited to the materials, conditions or process parameters set forth in these embodiments.

According to the present invention, the polyplastic web or film includes, but is not limited to, polyester, polypropylene, acrylic, polyvinylchloride or cellulose acetate film. Preferably, the polyplastic web or film is made from a polyester film, available from du Pont, ICI or Hoechst. In embodiments, the web or film has a thickness of about 0.00025 to about 0.0025 inch. Preferably, the web is about 0.001 inch thick.

In embodiments, the size and shape of the polyplastic web or film can be any suitable size and shape as desired for the particular processing equipment. However, in embodiments, it is preferred that the polyplastic web or film be in the form of long, narrow strips. For example, the strips are preferably from about 1 inch to about 12 inches wide, and more preferably about 4 inches wide. Using strips in the form of a roll permits easy handling of the material, and permits the material to be continuously drawn through the in-line production equipment described below, for example, by a pair of rollers located downstream of the bulk roll material. Of course, one of ordinary skill in the art will be able to alter the size and shape of the polyplastic web or film in view of the present disclosure to suit particular uses or process conditions.

A release coating is applied to the polyplastic web. The release coating or layer is a wax including, but not limited to, beeswax, vegetable wax, styrene, stearic acid and combinations thereof. In embodiments, the thickness of the wax layer is approximately about $0.0001 \pm 0.00005$ inch (i.e., about 0.00005 inch to about 0.00015 inch). In embodiments, the web may be coated with the wax by suitable gravure or flexographic coating processes.

The wax release layer is then coated with a resin including, but not limited to, vinyl resins, epoxy resins, resins cured by ultraviolet (UV) light, water-based resins, or combinations thereof. In embodiments, the resin may be crosslinked. The resin may contain a pigment that may be solvent resistant. In embodiments, a pigment or plurality of pigments can be mixed with a clear, cured or semi-cured resin and then coated on the wax. The pigment may be present in the resin in any effective amount.

Typically the pigment is present in an amount of from about 0.1% to about 15% by weight of total resin weight, although the amount can be outside of this range and can be readily adjusted to provide the desired color qualities. In embodiments, the wax release layer may be coated with the resin by suitable gravure or flexographic coating processes.

The resin and wax-coated polyplastic web may then optionally be passed through a holographic embossing machine in order to place a holographic information pattern (e.g., color, writing, symbol) on the coated wax. In embodiments, it is not necessary to pass the polyplastic web through a holographic embosser. For example, the holographic embosser may be used when it is desired to produce metallic flakes that, when coated on a receiving surface, provide a holographic or prismatic effect. However, if a more solid, non-prismatic appearance is desired, then the polyplastic web may simply be metallized as described below.

The resin and wax-coated polyplastic web is then metallized. In embodiments, a metal or combination of metals is deposited on the resin by vacuum deposition. Any metal that can be vacuum deposited can be used including, but not limited to, gold, silver, copper, platinum, aluminum and the like. The metallized polyplastic web is thus in the form of a sandwich (e.g., metal layer, resin, wax, polyplastic web).

The coated polyplastic web can be metallized on both sides. If both sides of the polyplastic web are coated with a release layer, metallic flakes according to the present invention can be produced from both sides. If only one side of the polyplastic web is coated with a release layer, metallic flakes are removed from the coated side, whereas the metal layer remains on the side not having a release layer. The resultant film can then be further processed in any process or application where transparent colored material is desired.

In embodiments, non-metal color coatings can be applied to the coated web in place of the metal. Such non-metal color coatings include any suitable colored pigment or other colored material that can be vacuum deposited on the release layer. When a non-metal color coating is applied to a resin and wax-coated polyplastic web that has been holographically embossed, it is important to use an optically clear material. This ensures that the holographic effect is still visible even after the small grooves made by the holographic embosser are filled in.

The sandwich or portions thereof are treated with a solvent including, but not limited to, acetone, alcohol, methylethylketone (MEK), mineral spirits, water and combinations thereof. Heat may also be used to treat the sandwich. In embodiments, the sandwich or portions thereof are pulled through, stretched, or shaked in a solvent bath. The metal and resin layers fall off the wax release layer as metallic flakes, which can then be separated from the solvent bath. In embodiments, any part of the release layer that comes off the polyplastic web is dissolved in the solvent.

The size of the metallic flakes is a function of the hardness of the release coating. The hardness of the release coating depends on the type of wax and the amount of solids contained therein as well as on the temperature and pressure used to apply the wax to the polyplastic web. If the release coat is hard, a strong solvent is needed to remove the metallic flakes from the release layer, and the metallized layer powders off. If the release coating is soft, a weaker solvent is needed and the metallized layer falls off as flakes. Preferably, the flakes are large, thus yielding more reflective properties. If less reflectance is desired, smaller flakes or powder may be used.

The solvent containing the flakes may then, in embodiments, be evaporated or filtered. The resultant flakes can be mixed with a lacquer, adhesive or another solution and then be sprayed, laminated, or applied to various surfaces. Alternatively, the flakes may be retained in the solvent or in a lacquer used as a solvent, and the solution directly processed or applied to a surface. Applications include, but are not limited to, car finishes; nail polish; decorative coatings; cosmetics; security inks; light filtering, light reflecting, and light diffracting coatings; products tags; and the like. Further, the flakes can be used to carry, store or record information in a variety of security or identification applications. The residual release coated web and/or solvent can be further processed in-line or in other applications, thereby precluding any waste of the materials.

The process of the present invention can, in an exemplary embodiment, be performed by an apparatus as shown in FIG. 1. In embodiments, the apparatus may include means for holding a polyplastic web; means for coating the polyplastic web with release and resin coatings; means for metallizing the coated polyplastic web; and means for treating the metallized web to form metallic flakes. The polyplastic web may be held by one or more rollers. In such an embodiment, the web is preferably held by one or more drive or pressure rollers 2 at the downstream end of the process line. This arrangement allows for tension created by the rollers to pull the polyplastic web through the various processing stations from a large roll of the web 1 located at the upstream end of the process line.

What is claimed is:

1. A process for producing metallic flakes, comprising:
   coating a polyplastic web with a release layer;
   depositing a resin on said release layer;
   depositing a metal layer on said resin to form a sandwich; and
   treating said sandwich with a solvent to remove the metal layer and resin in the form of metallic flakes.

2. The process according to claim 1, wherein the polyplastic web is selected from the group consisting of polyester, polypropylene, acrylic, polyvinylchloride and cellulose acetate film.

3. The process according to 1, wherein the polyplastic web has a thickness of about 0.00025 to about 0.0025 inch.

4. The process of claim 1, wherein said release coating is a wax.

5. The process of claim 4, wherein said wax is selected from the group consisting of beeswax, vegetable wax, styrene, stearic acid and combinations thereof.

6. The process according to claim 1, wherein said resin is selected from the group consisting of epoxy resins, vinyl resins, water-based resins, resins cured by ultraviolet light and combinations thereof.

7. The process of claim 1, wherein said resin further comprises a pigment.

8. The process according to claim 1, wherein said release layer has a thickness of about 0.00005 to 0.00015 inch.

9. The process of claim 1, further comprising subjecting the resin and wax-coated polyplastic web to holographic embossing.

10. The process according to claim 1, wherein said depositing of said metal layer is by vacuum deposition.

11. The process according to claim 1, wherein said metal layer is selected from the group consisting of gold, silver, copper, platinum, aluminum and combinations thereof.

12. The process of claim 1, wherein said treating comprises pulling the sandwich through a solvent.

13. A process for producing flakes, comprising:
   coating a polyplastic web with a release layer;
   depositing a resin on said release layer;
   depositing a color layer on said resin to form a sandwich; and
   treating said sandwich with a solvent to remove the color layer and resin in the form of is colored flakes.

14. A process for producing flakes comprising the steps of
   coating a polyplastic web with a release layer;
   thereafter coating said release layer with a resin to form a resin layer thereon;
   thereafter vacuum depositing a non-metal color coating on said resin layer to form a sandwich; and
   subsequently treating said sandwich with a solvent to separate said resin layer and said color coating layer from said release layer as flakes.

15. A process as set forth in claim 14 which further comprises the steps of holographically embossing the resin and release coated web prior to vacuum depositing said non-metal color coating thereon.

16. A process as set forth in claim 15 wherein said non-metal color coating is an optically clear material.

* * * * *